(12) United States Patent
Tomizawa et al.

(10) Patent No.: US 10,522,292 B2
(45) Date of Patent: Dec. 31, 2019

(54) MULTI-LAYER CERAMIC CAPACITOR AND METHOD OF PRODUCING THE SAME

(71) Applicant: Taiyo Yuden Co., Ltd., Tokyo (JP)

(72) Inventors: Yuji Tomizawa, Tokyo (JP); Wakae Akaishi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/909,543

(22) Filed: Mar. 1, 2018

(65) Prior Publication Data

US 2018/0301283 A1 Oct. 18, 2018

(30) Foreign Application Priority Data

Apr. 12, 2017 (JP) .................. 2017-078764

(51) Int. Cl.
| | |
|---|---|
| *H01G 4/30* | (2006.01) |
| *H01G 4/005* | (2006.01) |
| *H01G 4/008* | (2006.01) |
| *H01G 4/012* | (2006.01) |
| *H01G 4/12* | (2006.01) |
| *H01G 4/232* | (2006.01) |

(52) U.S. Cl.
CPC ............ *H01G 4/30* (2013.01); *H01G 4/005* (2013.01); *H01G 4/0085* (2013.01); *H01G 4/012* (2013.01); *H01G 4/12* (2013.01); *H01G 4/232* (2013.01); *H01G 4/1227* (2013.01); *H01G 4/1245* (2013.01)

(58) Field of Classification Search
CPC ........ H01G 4/38; H01G 4/012; H01G 4/1227; H01G 4/30; H01G 4/005; H01G 4/0085; H01G 4/12; H01G 4/232; H01G 4/1245; H01L 21/4857; H01L 21/486; H01L 23/49822; H01L 23/49827; H01L 23/49838

USPC ........................................ 361/321.2
See application file for complete search history.

(56) References Cited

U.S. PATENT DOCUMENTS

| | | | | |
|---|---|---|---|---|
| 3,648,132 | A * | 3/1972 | Rayburn ............ | H01G 4/255 361/271 |
| 2014/0138138 | A1* | 5/2014 | Park .................. | H05K 1/183 174/260 |
| 2018/0090275 | A1* | 3/2018 | Lee ................... | H01G 4/005 |

FOREIGN PATENT DOCUMENTS

| | | |
|---|---|---|
| JP | 2010-205812 A | 9/2010 |
| JP | 2016-134456 A | 7/2016 |

* cited by examiner

*Primary Examiner* — Michael P McFadden
(74) *Attorney, Agent, or Firm* — Saliwanchik, Lloyd & Eisenschenk

(57) ABSTRACT

A multi-layer ceramic capacitor includes a ceramic body, a first external electrode, and a second external electrode. The ceramic body includes ceramic layers laminated along a first direction, first internal electrodes and second internal electrodes that are alternately disposed between the ceramic layers, a first end surface and a second end surface that are oriented in a second direction orthogonal to the first direction, and a first inner groove and a second inner groove that are respectively formed in the first end surface and the second end surface along the first direction. The first and second external electrodes respectively cover the first and second end surfaces, the first internal electrodes being drawn to the first end surface and protruding in the first inner groove, the second internal electrodes being drawn to the second end surface and protruding in the second inner groove.

7 Claims, 12 Drawing Sheets

MULTI-LAYER CERAMIC CAPACITOR AND METHOD OF PRODUCING THE SAME

CROSS-REFERENCE TO RELATED APPLICATION

This application claims the benefit under 35 U.S.C. § 119 of Japanese Patent Application No. 2017-078764, filed Apr. 12, 2017, the disclosure of which is herein incorporated by reference in its entirety.

BACKGROUND

The present invention relates to a multi-layer ceramic capacitor and a method of producing the multi-layer ceramic capacitor.

In a multi-layer ceramic capacitor, external electrodes are provided to end surfaces of a ceramic body including internal electrodes drawn to the end surfaces, and the internal electrodes and the external electrodes are electrically connected to each other. However, when the internal electrodes are oxidized in the vicinity of the end surfaces of the ceramic body at the time of sintering or the like, electrical conduction between the internal electrodes and the external electrodes is inhibited in some cases.

In contrast to the above, there is known a technique of ensuring electrical conduction between the internal electrodes and the external electrodes by removing the oxidized end portions of the internal electrodes by a chemical solution, polishing, or the like (see, for example, Japanese Patent Application Laid-open Nos. 2016-134456 and 2010-205812).

SUMMARY

However, in the technique of removing the oxidized end portions of the internal electrodes, the performance of the multi-layer ceramic capacitor is prone to be lowered due to the influence of the residual of the chemical solution, polishing debris, or the like.

In view of the circumstances as described above, it is desirable to provide a multi-layer ceramic capacitor and a method of producing the same, which are capable of ensuring electrical conduction between an internal electrode and an external electrode.

According to an embodiment of the present invention, there is provided a multi-layer ceramic capacitor including a ceramic body, a first external electrode, and a second external electrode.

The ceramic body includes ceramic layers laminated along a first direction, first internal electrodes and second internal electrodes that are alternately disposed between the ceramic layers, a first end surface and a second end surface that are oriented in a second direction orthogonal to the first direction, and at least one first inner groove and at least one second inner groove that are respectively formed in the first end surface and the second end surface along the first direction.

The first external electrode and the second external electrode respectively cover the first end surface and the second end surface.

The first internal electrodes are drawn to the first end surface and protrude in the at least one first inner groove.

The second internal electrodes are drawn to the second end surface and protrude in the at least one second inner groove.

In this configuration, since the first internal electrodes protrude in the first inner groove and the second internal electrodes protrude in the second inner groove, the first internal electrodes and the first external electrode are electrically connected to each other at least in the first inner groove, and the second internal electrodes and the second external electrode are electrically connected to each other at least in the second inner groove. As a result, even if the first internal electrodes are oxidized in a region adjacent to the first end surface and the second internal electrodes are oxidized in a region adjacent to the second end surface, electrical conduction between the first internal electrodes and the first external electrode and between the second internal electrodes and the second external electrode can be ensured.

The at least one first inner groove may include a plurality of first inner grooves, and the at least one second inner groove may include a plurality of second inner grooves.

In this configuration, electrical conduction between the first internal electrodes and the first external electrode and between the second internal electrodes and the second external electrode can be obtained more reliably.

The first external electrode may include at least one first outer groove, the at least one first outer groove corresponding to the at least one first inner groove and being formed along the first direction. The second external electrode may include at least one second outer groove, the at least one second outer groove corresponding to the at least one second inner groove and being formed along the first direction.

In this configuration, when the multi-layer ceramic capacitor is mounted, solder wets up along the first outer groove and the second outer groove. Thus, connection strength provided by the solder is increased.

The first external electrode and the second external electrode may be each formed as a sputtering film.

In this configuration, the first external electrode and the second external electrode can be formed without using a wet process.

According to another embodiment of the present invention, there is provided a method of producing a multi-layer ceramic capacitor, the method including: producing an unsintered ceramic body including ceramic layers laminated along a first direction, first internal electrodes and second internal electrodes that are alternately disposed between the ceramic layers, and a first end surface and a second end surface that are oriented in a second direction orthogonal to the first direction, the first internal electrodes being drawn to the first end surface, the second internal electrodes being drawn to the second end surface; sintering the ceramic body; forming a first inner groove in the first end surface of the sintered ceramic body and a second inner groove in the second end surface of the sintered ceramic body along the first direction by irradiation with short-pulse laser, to cause the first internal electrodes and the second internal electrodes to respectively protrude in the first inner groove and the second inner groove; and forming a first external electrode on the first end surface and a second external electrode on the second end surface, the first end surface including the first inner groove, the second end surface including the second inner groove.

The short-pulse laser may include one of pico-second laser and femto-second laser.

In this configuration, the irradiation with short-pulse laser allows the first inner groove and the second inner groove to be formed, the first internal electrodes and the second internal electrodes respectively protruding in the first inner groove and the second inner groove. This can produce a multi-layer ceramic capacitor in which electrical conduction between the first internal electrodes and the first external electrode and between the second internal electrodes and the second external electrode is ensured.

The first external electrode and the second external electrode may be formed by sputtering.

In this configuration, the first external electrode and the second external electrode can be formed without using a wet process.

The first inner groove and the second inner groove may be formed after the sintered ceramic body is reoxidized.

In this configuration, the ceramic body is reoxidized, and thus a multi-layer ceramic capacitor having a large capacitance is easily obtained. Further, even if the first internal electrodes are oxidized in a region adjacent to the first end surface and the second internal electrodes are oxidized in a region adjacent to the second end surface at the time of reoxidation of the ceramic body, the first inner groove and the second inner groove are subsequently formed, so that the first internal electrodes and the second internal electrodes can be exposed. With this configuration, electrical conduction between the first internal electrodes and the first external electrode and between the second internal electrodes and the second external electrode can be ensured.

It is possible to provide a multi-layer ceramic capacitor and a method of producing the same, which are capable of ensuring electrical conduction between an internal electrode and an external electrode.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, an embodiment of the present invention will be described with reference to the drawings.

In the figures, an X axis, a Y axis, and a Z axis orthogonal to one another are shown as appropriate. The X axis, the Y axis, and the Z axis are common in all figures.

1. Basic Configuration of Multi-layer Ceramic Capacitor 10

Figure 1:
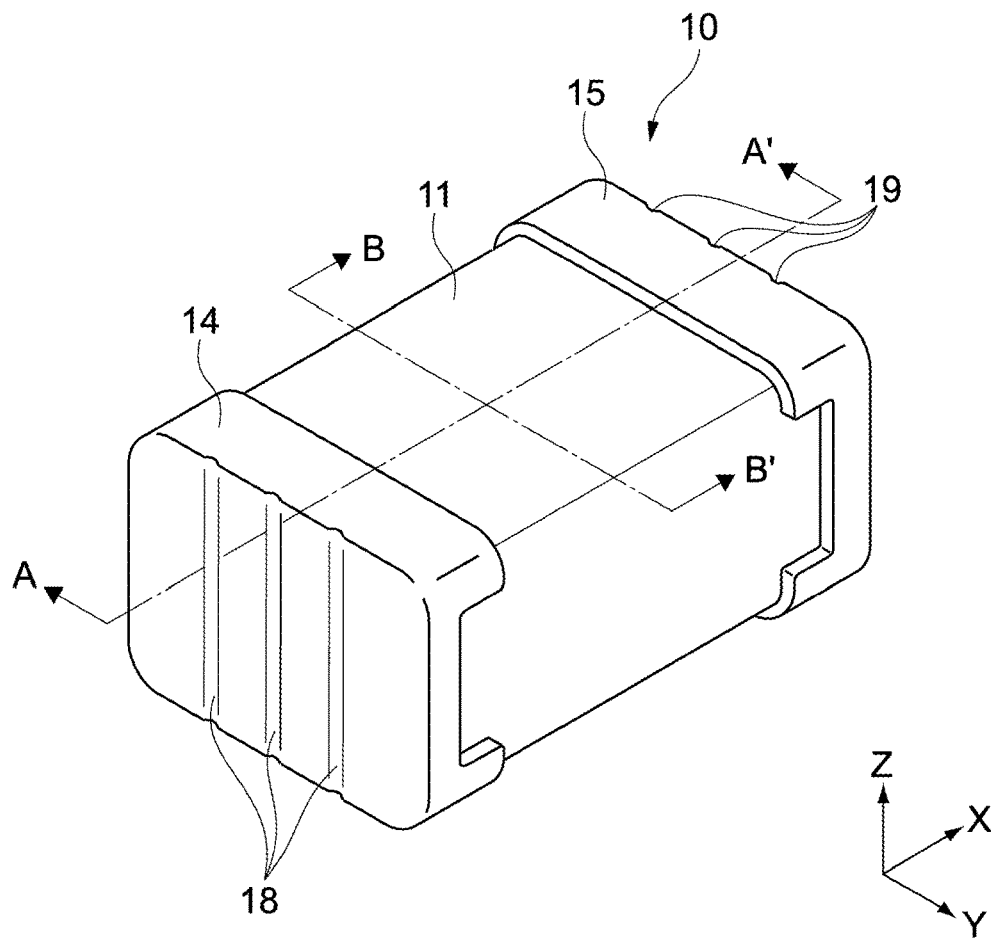
FIG. 1 is a perspective view of a multi-layer ceramic capacitor according to one embodiment of the present invention.
Figure 2:
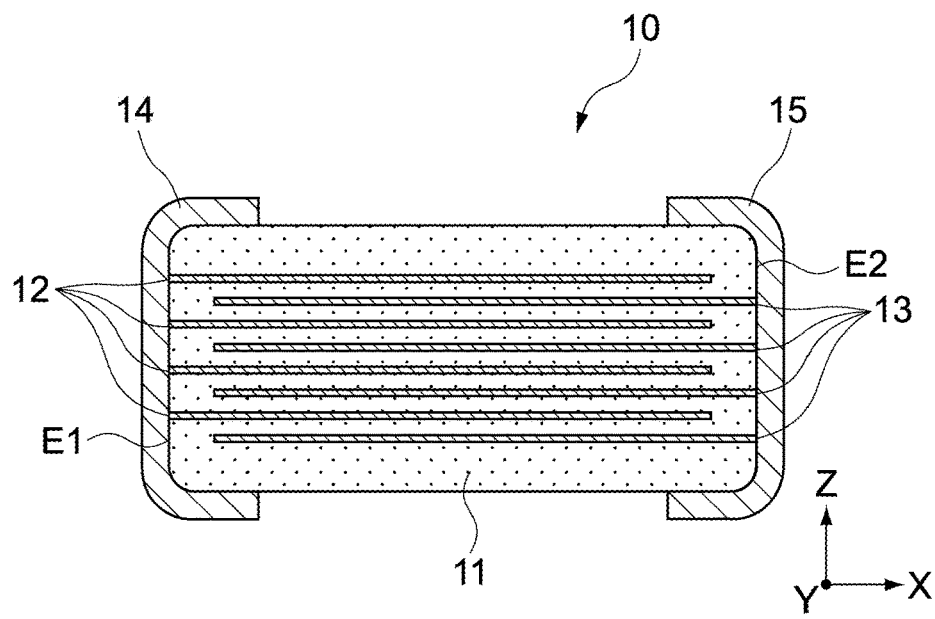
FIG. 2 is a cross-sectional view of the multi-layer ceramic capacitor taken along the A-A' line in FIG. 1.
Figure 3:
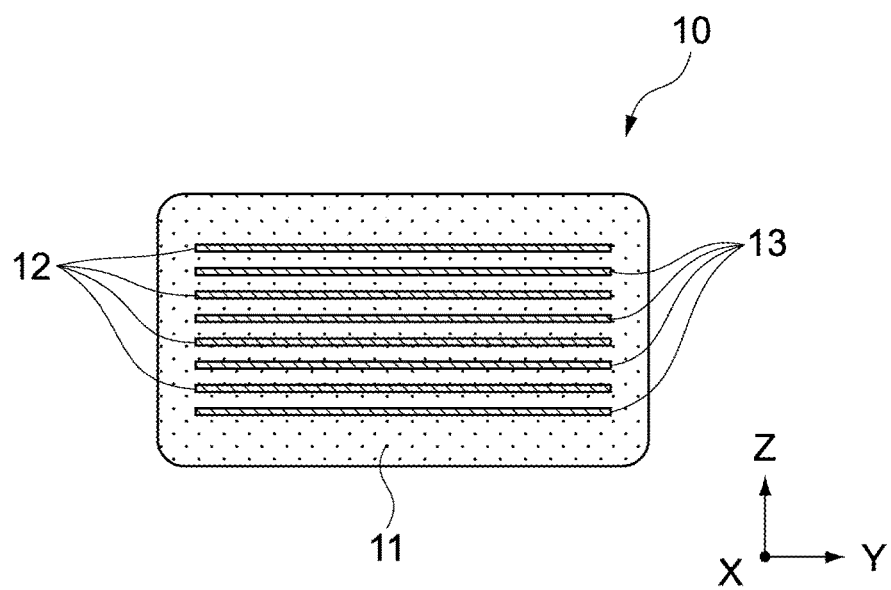
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. The ceramic body 11 has a first end surface E1 and a second end surface E2 that are oriented in an X-axis direction, two side surfaces oriented in a Y-axis direction, and two main surfaces oriented in a Z-axis direction. Ridges connecting the respective surfaces of the ceramic body 11 are chamfered.

It should be noted that the shape of the ceramic body 11 is not limited to the shape as described above. In other words, the ceramic body 11 does not need to have the rectangular shape as shown in FIGS. 1 to 3. For example, the surfaces of the ceramic body 11 may be curved surfaces, and the ceramic body 11 may be rounded as a whole.

The first external electrode 14 covers the first end surface E1 of the ceramic body 11. The second external electrode 15 covers the second end surface E2 of the ceramic body 11. The first external electrode 14 and the second external electrode 15 face each other in the X-axis direction with the ceramic body 11 therebetween and function as terminals of the multi-layer ceramic capacitor 10.

The first external electrode 14 and the second external electrode 15 are each formed of a good conductor of electricity. Examples of the good conductor of electricity forming the first external electrode 14 and the second external electrode 15 include a metal mainly containing copper (Cu), nickel (Ni), tin (Sn), palladium (Pd), platinum (Pt), silver (Ag), gold (Au), or the like, and an alloy of those metals.

The first external electrode 14 and the second external electrode 15 respectively extend from the first end surface E1 and the second end surface E2 of the ceramic body 11 and slightly come around the side surfaces. With this configuration, the first external electrode 14 and the second external electrode 15 each have a U-shaped appearance when viewed from the Y-axis direction. Further, the first external electrode 14 and the second external electrode 15 each have a U-shaped cross section parallel to an X-Z plane.

It should be noted that the shapes of the first external electrode 14 and the second external electrode 15 are not limited to the shapes shown in FIG. 1. For example, the first external electrode 14 and the second external electrode 15 may respectively extend from the first end surface E1 and the second end surface E2 of the ceramic body 11 to one of the main surfaces such that each cross section parallel to the X-Z plane has an L shape. Further, the first external electrode 14 and the second external electrode 15 may extend to the side surface(s) by the extension amount equal to the extension amount to the main surface. Furthermore, the first external electrode 14 and the second external electrode 15 may respectively remain within the first end surface E1 and the second end surface E2 without extending to the main and side surfaces of the ceramic body 11.

The ceramic body 11 is formed of dielectric ceramics. The ceramic body 11 includes first internal electrodes 12 and second internal electrodes 13 that are covered with dielectric ceramics. The first internal electrodes 12 and the second internal electrodes 13 each have a sheet-like shape extending along an X-Y plane and are alternately disposed along the Z-axis direction.

In other words, the first internal electrode 12 and the second internal electrode 13 face each other in the Z-axis direction with the ceramic layer therebetween. The first internal electrodes 12 are drawn to the first end surface E1 of the ceramic body 11 and connected to the first external electrode 14. The second internal electrodes 13 are drawn to the second end surface E2 of the ceramic body 11 and connected to the second external electrode 15.

The first internal electrodes 12 and the second internal electrodes 13 are each formed of a good conductor of electricity and function as internal electrodes of the multi-layer ceramic capacitor 10. Examples of the good conductor of electricity forming the first and second internal electrodes 12 and 13 include a metal mainly containing nickel (Ni), copper (Cu), palladium (Pd), platinum (Pt), silver (Ag), gold (Au), or the like, and an alloy of those metals.

In the ceramic body 11, in order to increase capacitances of the respective ceramic layers provided between the first internal electrodes 12 and the second internal electrodes 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

It should be noted that the ceramic layers may be formed of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

With the configuration described above, when a voltage is applied between the first external electrode 14 and the second external electrode 15 in the multi-layer ceramic capacitor 10, the voltage is applied to the plurality of ceramic layers between the first internal electrodes 12 and the second internal electrodes 13. This allows the multi-layer ceramic capacitor 10 to store charge corresponding to the voltage applied between the first external electrode 14 and the second external electrode 15.

It should be noted that the basic configuration of the multi-layer ceramic capacitor 10 according to this embodiment is not limited to that shown in FIGS. 1 to 3 and can be changed as appropriate. For example, the number of first internal electrodes 12 and second internal electrodes 13 and the thickness of each ceramic layer can be determined as appropriate according to the size and performance expected for the multi-layer ceramic capacitor 10.

2. Detailed Configuration of Multi-layer Ceramic Capacitor 10

Figure 4:
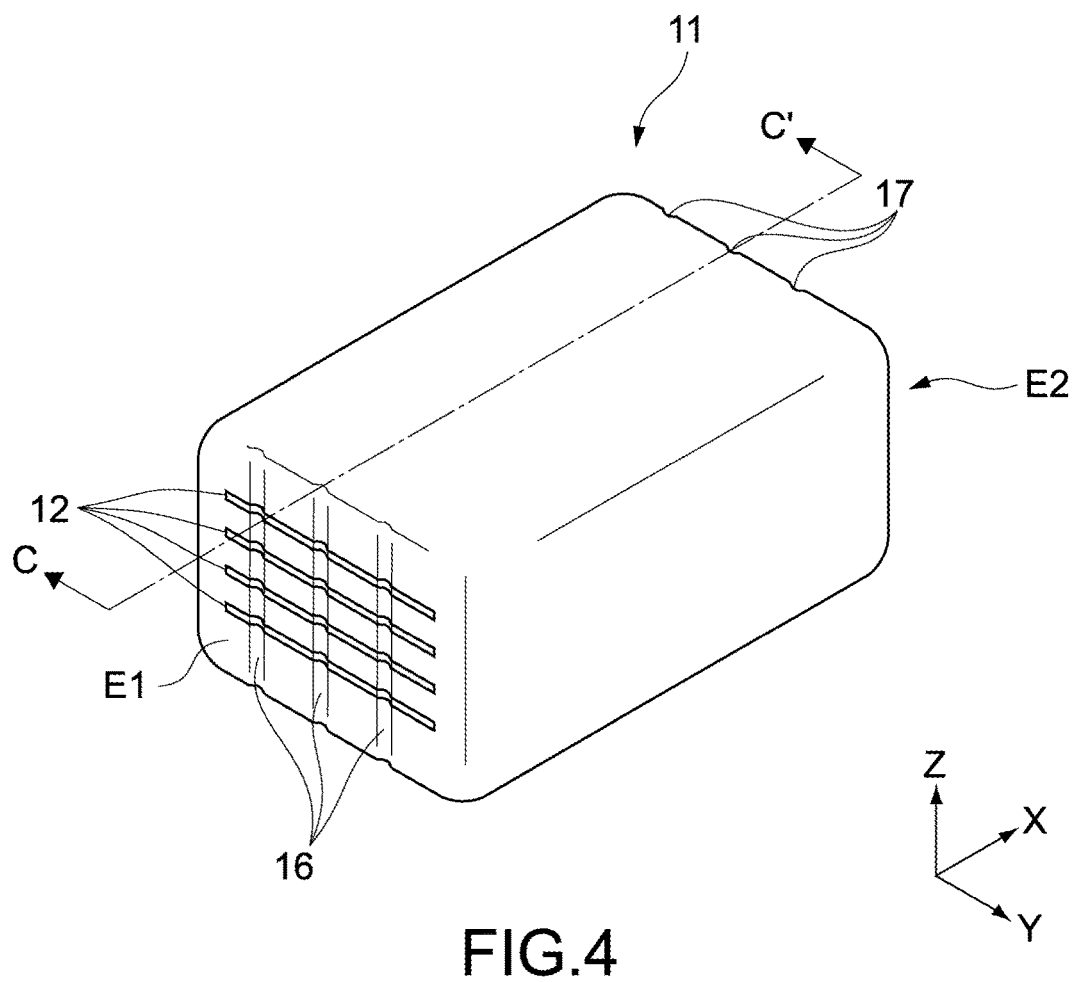
FIG. 4 is a perspective view of a ceramic body of the multi-layer ceramic capacitor.

FIG. 4 is a perspective view of the ceramic body 11 of the multi-layer ceramic capacitor 10. In the ceramic body 11, the first end surface E1 includes first inner grooves 16, and the second end surface E2 includes second inner grooves 17. The first inner grooves 16 and the second inner grooves 17 are formed as grooves recessed in the X-axis direction and linearly extending along the Z-axis direction.

The three first inner grooves 16 and the three second inner grooves 17 are respectively disposed on the first end surface E1 and the second end surface E2 at mirror-symmetrical positions with intervals therebetween in the Y-axis direction. The first inner grooves 16 extend over the entire width of the first end surface E1 in the Z-axis direction so as to pass through all the end portions of the first internal electrodes 12 in the first end surface E1, the end portions being in the X-axis direction. The second inner grooves 17 extend over the entire width of the second end surface E2 in the Z-axis direction so as to pass through all the end portions of the second internal electrodes 13 in the second end surface E2, the end portions being in the X-axis direction.

Figure 5:
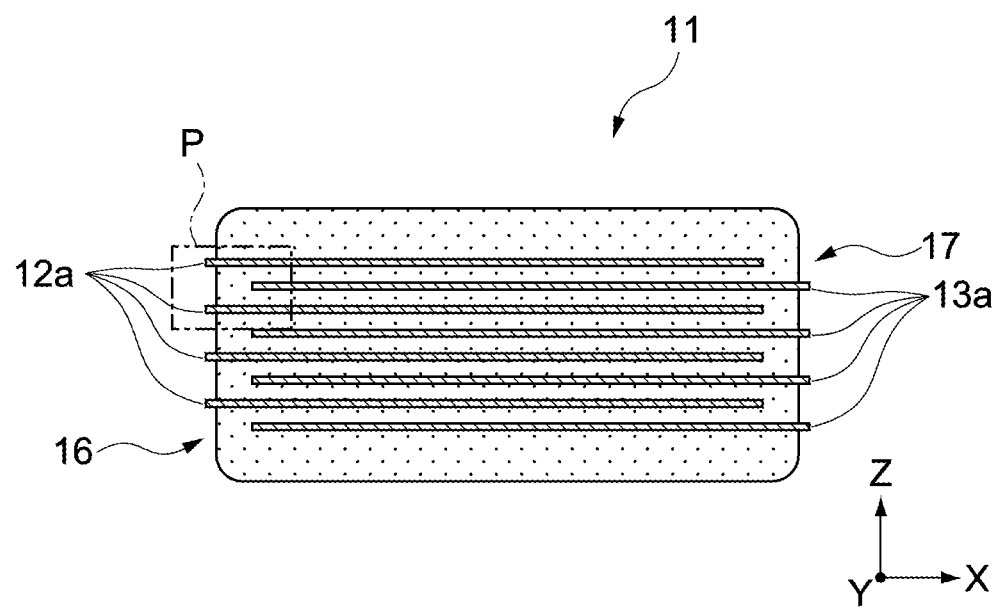
FIG. 5 is a cross-sectional view of the ceramic body taken along the C-C' line in FIG. 4.

FIG. 5 is a cross-sectional view of the ceramic body 11 taken along the C-C' line in FIG. 4. In other words, FIG. 5 shows a cross section along the first inner groove 16 and the second inner groove 17 in the ceramic body 11. Each of the first internal electrodes 12 includes a first protrusion 12a that is formed in the first inner groove 16. Each of the second internal electrodes 13 includes a second protrusion 13a that is formed in the second inner groove 17.

Figure 6:
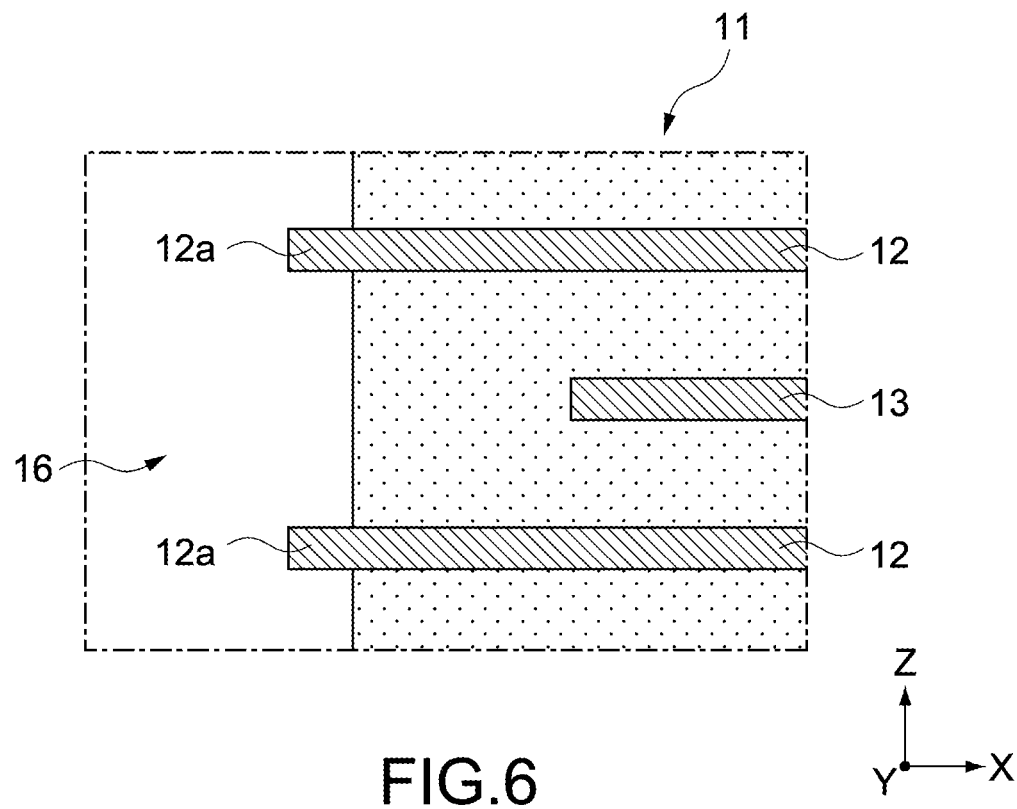
FIG. 6 is an enlarged partial cross-sectional view of a region P of the ceramic body shown in FIG. 5.

FIG. 6 is an enlarged partial cross-sectional view of a region P surrounded by a chain line of FIG. 5. The first protrusions 12a protrude in the X-axis direction and are exposed in the first inner groove 16. In a similar manner, the second protrusions 13a protrude in the X-axis direction and are exposed in the second inner groove 17.

With this configuration, the first external electrode 14 can be reliably electrically connected to the first protrusions 12a exposed to the first end surface E1, and the second external electrode 15 can be reliably electrically connected to the second protrusions 13a exposed to the second end surface E2. In other words, in the multi-layer ceramic capacitor 10, electrical conduction between the first internal electrodes 12 and the first external electrode 14 and between the second internal electrodes 13 and the second external electrode 15 can be ensured at least in the first inner grooves 16 and the second inner grooves 17, respectively.

Further, as shown in FIG. 1, the first external electrode 14 of the multi-layer ceramic capacitor 10 includes outer grooves 18 along the first inner grooves 16 of the ceramic body 11, and the second external electrode 15 of the multi-layer ceramic capacitor 10 includes outer grooves 19 along the second inner grooves 17 of the ceramic body 11. The outer grooves 18 emerge when the shapes of the first inner grooves 16 in the first end surface E1 of the ceramic body 11 are reflected in the shape of the first external electrode 14. The outer grooves 19 emerge when the shapes of the second inner grooves 17 in the second end surface E2 of the ceramic body 11 are reflected in the shape of the second external electrode 15.

Figure 7:
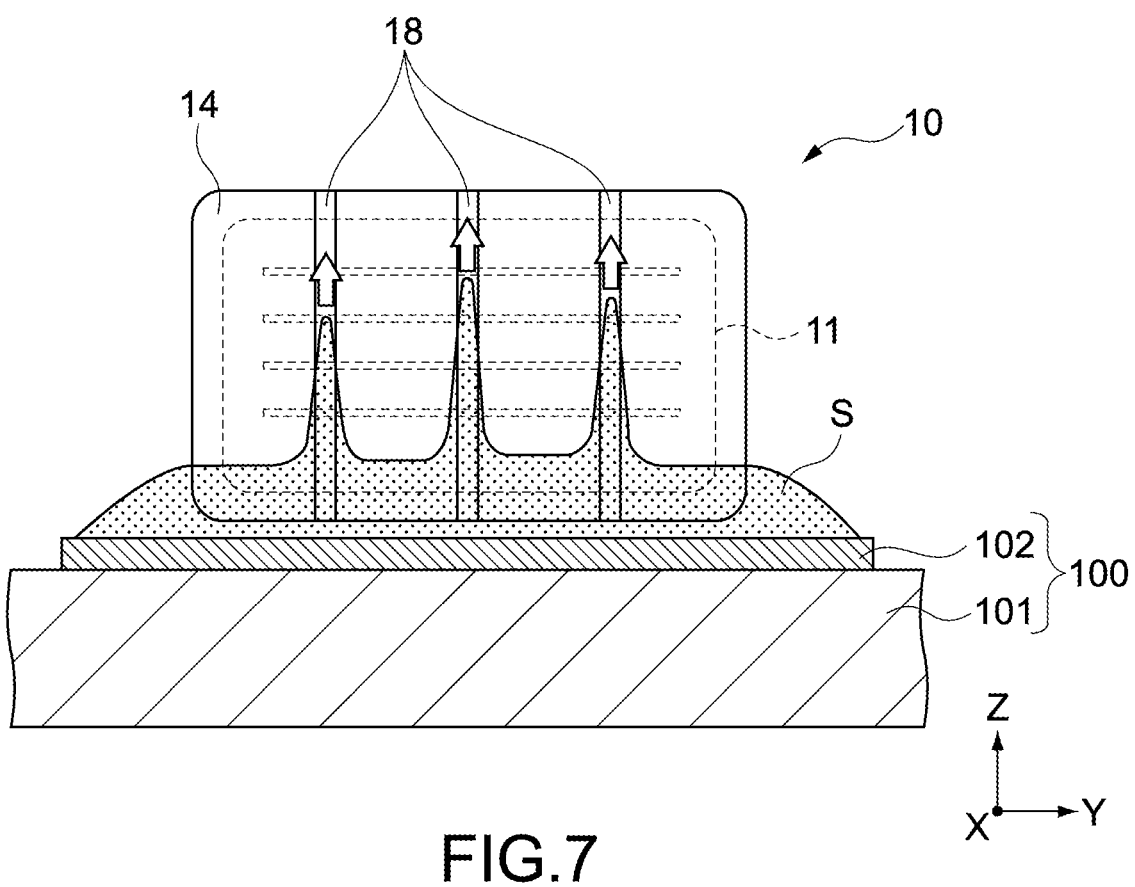
FIG. 7 is a diagram showing a state where the multi-layer ceramic capacitor is mounted.

FIG. 7 is a diagram showing a state where the multi-layer ceramic capacitor 10 is mounted. FIG. 7 shows a state where the multi-layer ceramic capacitor 10 is viewed from the first external electrode 14 side in the X-axis direction. FIG. 7 shows the first external electrode 14, but the same holds true for the second external electrode 15. FIG. 7 shows the position of the ceramic body 11 by a broken line.

The multi-layer ceramic capacitor 10 is mounted on a mount substrate 100 including a base material 101 and an electrode 102 formed thereon. The multi-layer ceramic capacitor 10 is heated in a reflow furnace or the like, with the first external electrode 14 and the second external electrode 15 being disposed on the electrode 102 of the mount substrate 100 via solder S.

In such a manner, the molten solder S wet-spreads on both the electrode 102 of the mount substrate 100 and the first and second external electrodes 14 and 15 of the multi-layer ceramic capacitor 10. At that time, in the first external electrode 14 and the second external electrode 15, as shown in FIG. 7, the molten solder S wets up in the Z-axis direction along the outer grooves 18 and 19 by a capillary phenomenon.

Due to such behavior of the solder 5, regions connected to the solder S in the first external electrode 14 and the second external electrode 15 are expanded in the Z-axis direction. As a result, the connection strength of the solder S to the first and second external electrodes 14 and 15 is increased. Therefore, in the multi-layer ceramic capacitor 10, the action of the outer grooves 18 and 19 improves mounting reliability.

Further, it is necessary to use a large amount of solder S so as to cause the solder S to sufficiently wet up in the Z-axis direction over the entire regions of the first external electrode 14 and the second external electrode 15, but the configuration using the outer grooves 18 and 19 can improve the connection strength with a small amount of solder S. Therefore, in the multi-layer ceramic capacitor 10, the improvement of the mounting reliability can be achieved at low cost.

It should be noted that in the multi-layer ceramic capacitor 10, the configuration in which the first external electrode 14 includes the outer grooves 18 and the second external electrode 15 includes the outer grooves 19 is not indispensable. Therefore, if the effect as described above is not particularly expected, the first external electrode 14 does not need to include the outer grooves 18, the second external electrode 15 does not need to include the outer grooves 19, and the first and second external electrodes 14 and 15 can have flat and smooth surfaces.

3. Method of Producing Multi-layer Ceramic Capacitor 10

Figure 8:
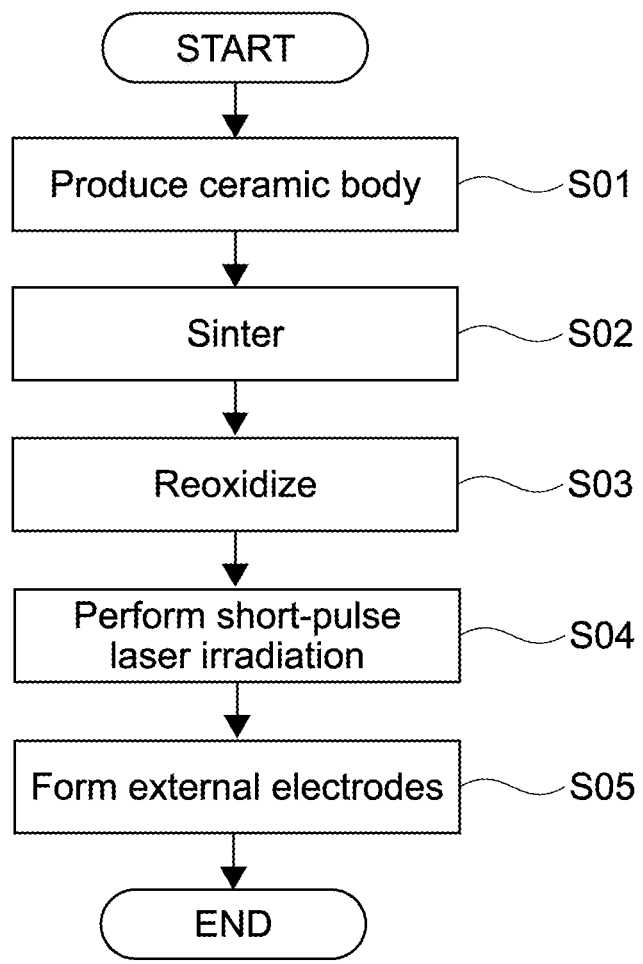
FIG. 8 is a flowchart showing a method of producing the multi-layer ceramic capacitor.

FIG. 8 is a flowchart showing a method of producing the multi-layer ceramic capacitor 10. FIGS. 9 to 16C are views each showing a production process of the multi-layer ceramic capacitor 10. Hereinafter, the method of producing the multi-layer ceramic capacitor 10 will be described along FIG. 8 with reference to FIGS. 9 to 16C as appropriate.

3.1 Step S01: Production of Ceramic Body

Figure 9:
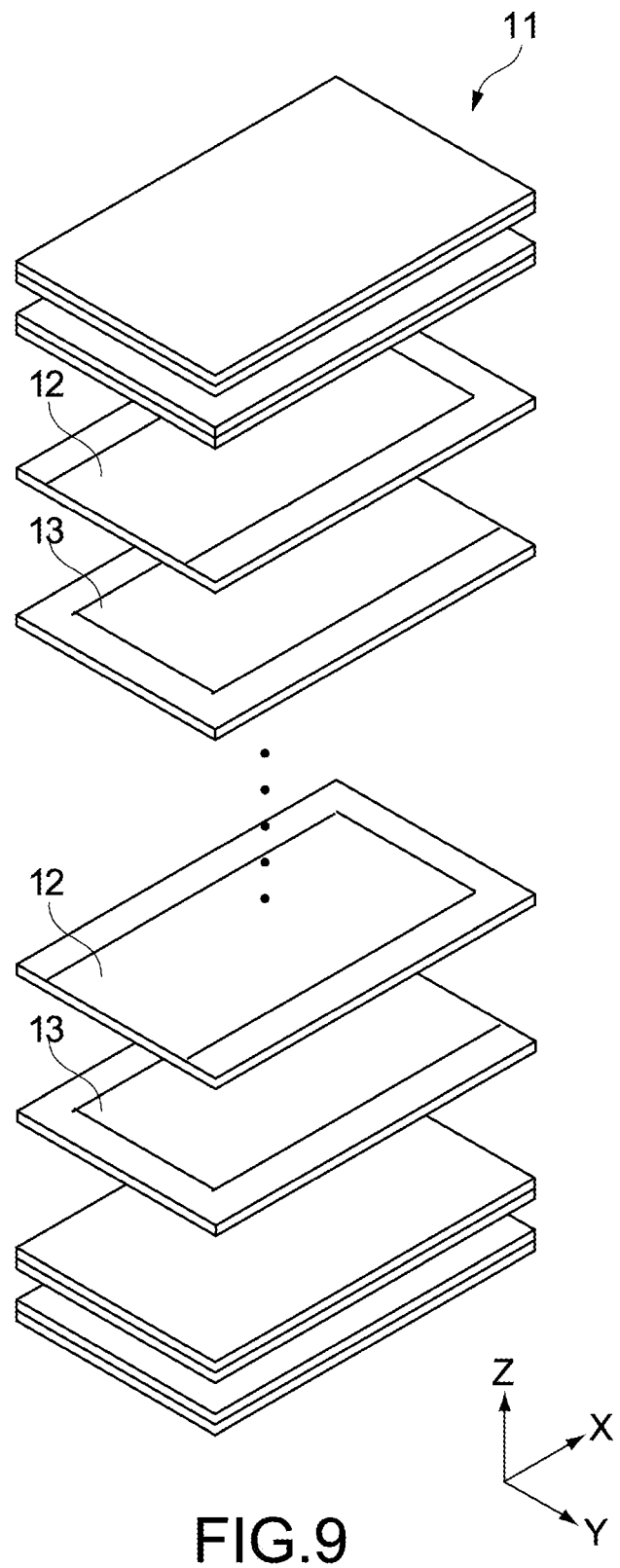
FIG. 9 is an exploded perspective view of the ceramic body in Step S01.

In Step S01, an unsintered ceramic body 11 is produced. As shown in FIG. 9, the unsintered ceramic body 11 is obtained by laminating a plurality of ceramic sheets in the Z-axis direction and performing thermocompression bonding thereon. An electrically conductive paste with a predetermined pattern is printed on each of the ceramic sheets in advance, so that the first internal electrodes 12 and the second internal electrodes 13 can be disposed.

3.2 Step S02: Sintering

In Step S02, the unsintered ceramic body 11 obtained in Step S01 is sintered. When a barium titanate based material is used as dielectric ceramics, the sintering temperature can be set to approximately 1,000 to 1,300° C. Further, the ceramic body 11 can be sintered under a reduction atmosphere or a low-oxygen partial pressure atmosphere, for example.

Figure 10:
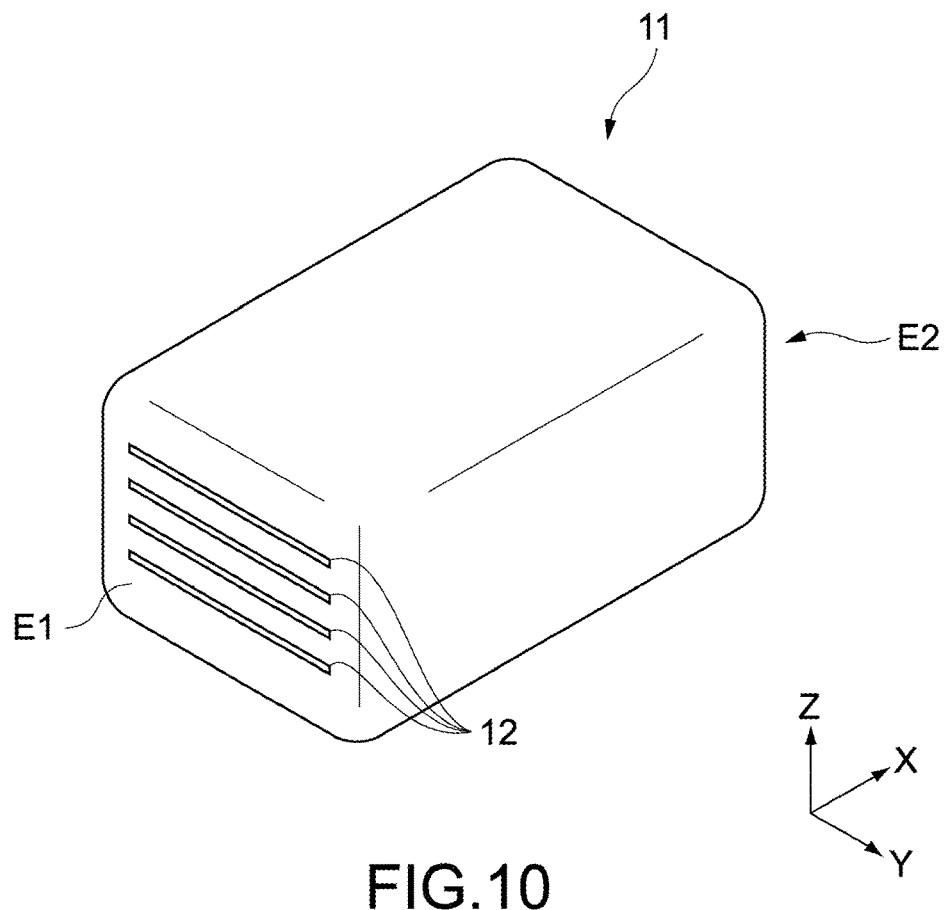
FIG. 10 is a perspective view of the ceramic body obtained in Step S02.

FIG. 10 is a perspective view of the ceramic body 11 after sintering. The first internal electrodes 12 and the second internal electrodes 13 have a larger shrinkage amount than the dielectric ceramics at the time of sintering. For that reason, at the time of sintering, the first internal electrodes 12 and the second internal electrodes 13 are respectively recessed inward in the X-axis direction from the first end surface E1 and the second end surface E2 and are not exposed respectively to the first end surface E1 and the second end surface E2 in some cases.

Figure 11:
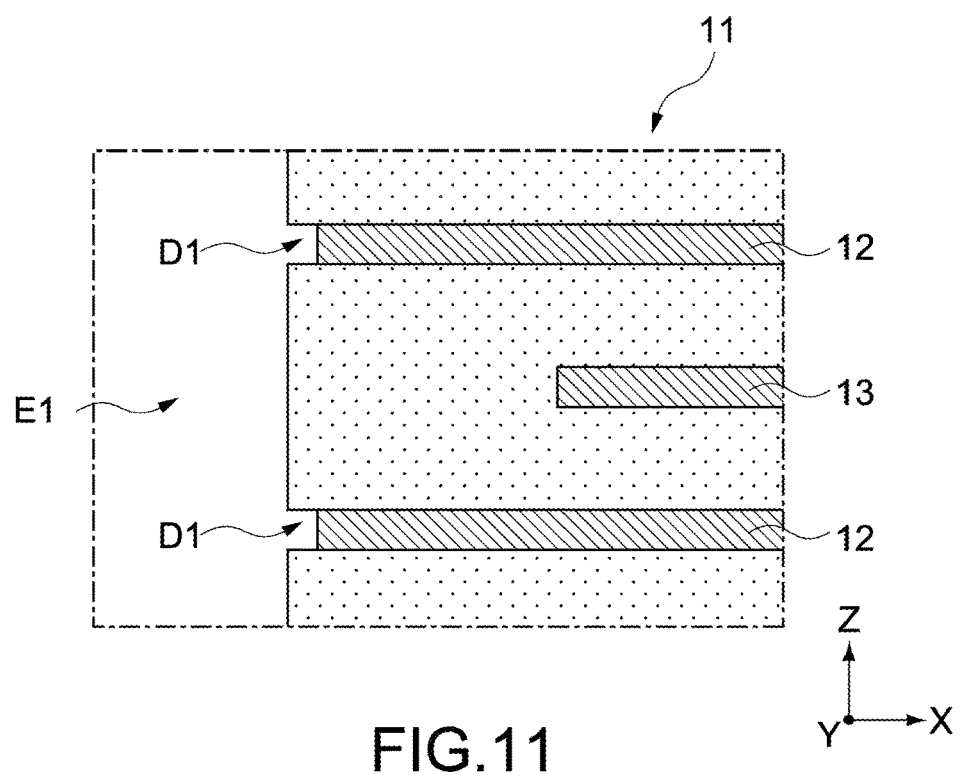
FIG. 11 is a partial cross-sectional view exemplifying a state of the ceramic body obtained after Step S02.

In other words, as shown in FIG. 11, a void D1 may be formed between each first internal electrode 12 and the first end surface E1. Similarly, a void D1 may also be formed between each second internal electrode 13 and the second end surface E2. In such a case, the first external electrode 14 and the second external electrode 15 respectively have difficulty in being electrically connected to the first internal electrodes 12 and the second internal electrodes 13 in the first end surface E1 and the second end surface E2.

However, in the production method according to this embodiment, even if the voids D1 are formed in this Step S02, electrical conduction between the first internal electrodes 12 and the first external electrode 14 and between the second internal electrodes 13 and the second external electrode 15 can be ensured by providing the first inner grooves 16 and the second inner grooves 17 respectively to the first end surface E1 and the second end surface E2 of the ceramic body 11 in Step S04 (short-pulse laser irradiation) that will be described later.

3.3 Step S03: Reoxidation

In Step S03, the ceramic body 11 sintered in Step S02 is reoxidized. In Step S03, the dielectric ceramics forming the sintered ceramic body 11 is supplemented with oxygen because of the lack of oxygen. This can increase the capacitance of the multi-layer ceramic capacitor 10. It should be noted that Step S03 may be omitted as appropriate.

The ceramic body 11 can be reoxidized by heating at approximately 600 to 1,000° C. under an oxidizing atmosphere, for example. The reoxidation of the ceramic body 11 may lead to the oxidation of the end portions of the first and second internal electrodes 12 and 13 in the X-axis direction, the end portions being exposed to the first and second end surfaces E1 and E2 of the ceramic body 11.

Figure 12:
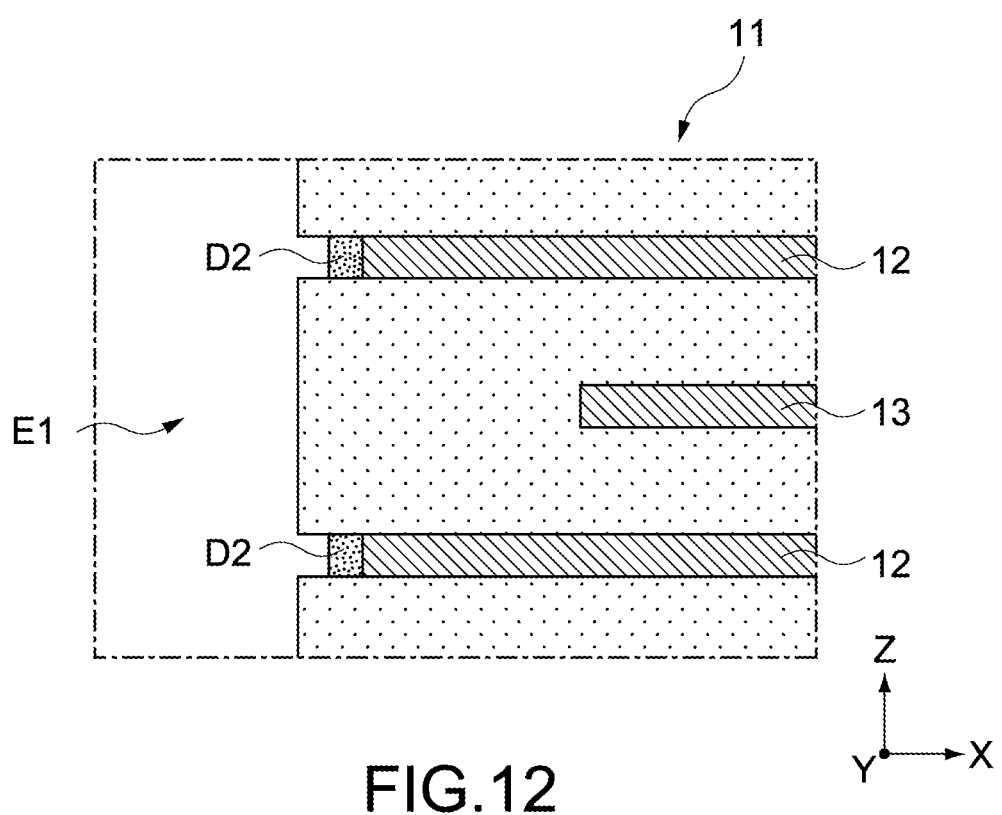
FIG. 12 is a partial cross-sectional view exemplifying a state of the ceramic body obtained after Step S03.

In other words, as shown in FIG. 12, oxidized regions D2 may be formed at the end portions of the first internal electrodes 12 in the X-axis direction. Similarly, oxidized regions D2 may also be formed at the end portions of the second internal electrodes 13 in the X-axis direction. In this case, because the oxidized regions D2 do not have electrical conductivity, the first external electrode 14 and the second external electrode 15 respectively have difficulty in being electrically connected to the first internal electrodes 12 and the second internal electrodes 13 in the first end surface E1 and the second end surface E2.

However, in the production method according to this embodiment, even if the oxidized regions D2 are formed in this Step S03, electrical conduction between the first internal electrodes 12 and the first external electrode 14 and between the second internal electrodes 13 and the second external electrode 15 can be ensured by providing the first inner grooves 16 and the second inner grooves 17 respectively to the first end surface E1 and the second end surface E2 of the ceramic body 11 in Step S04 (short-pulse laser irradiation) that will be described later.

3.4 Step S04: Short-pulse Laser Irradiation

In Step S04, the first end surface E1 and the second end surface E2 of the ceramic body 11 reoxidized in Step S03 are irradiated with short-pulse laser having a short pulse width, to form the first inner grooves 16 and the second inner grooves 17. Using the short-pulse laser, the material forming the first and second end surfaces E1 and E2 of the ceramic body 11 can be sublimated.

Specifically, the short-pulse laser used in Step S04 can be selected from various types of pulse laser having a pulse width in a pico-second range or below the pico-second range. Examples of such short-pulse laser include picosecond laser having a pulse width in a pico-second range and femto-second laser having a pulse width in a femto-second range.

Figure 13:
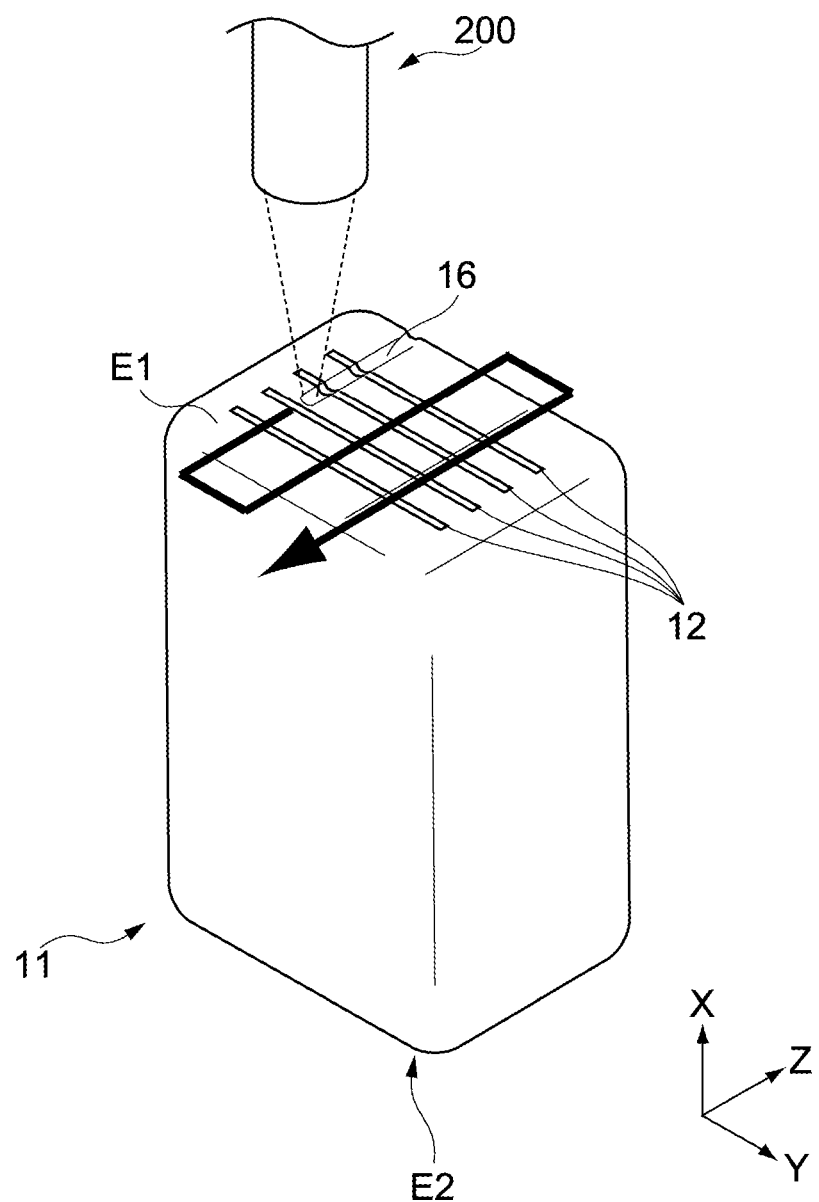
FIG. 13 is a perspective view of the ceramic body in Step S04.

FIG. 13 shows a state where a laser irradiation device 200 is irradiating the first end surface E1 of the ceramic body 11 with short-pulse laser. The short-pulse laser is scanned as indicated by the arrow in FIG. 13, and the first inner grooves 16 can be formed in the first end surface E1. Further, the second inner grooves 17 can be formed in the second end surface E2 in a similar manner to the above.

Operating conditions in the laser irradiation device 200, such as a laser spot diameter, laser intensity, a scanning speed, and the number of times of repeating scanning, can be determined as appropriate such that the first inner grooves 16 and the second inner grooves 17 have the configuration shown in FIGS. 5 and 6. Specifically, the operating conditions of the laser irradiation device 200 can be determined such that the oxide selectively sublimates and the metal is difficult to sublimate in the first end surface E1 and the second end surface E2 according to the materials forming the ceramic layers and the first and second internal electrodes 12 and 13, the shapes of the first and second end surfaces E1 and E2 of the ceramic body 11, the width of the oxidized region D2, and the like.

Thus, in the first end surface E1 and the second end surface E2, the oxidized regions D2 formed in the dielectric ceramics and the first and second internal electrodes 12 and 13 selectively sublimate and are thus removed. Meanwhile, the first and second internal electrodes 12 and 13 formed of the metal are difficult to sublimate. Thus, the first protrusions 12a of the first internal electrodes 12 and the second protrusions 13a of the second internal electrodes 13 as shown in FIGS. 5 and 6 are respectively formed in the first inner grooves 16 and the second inner grooves 17.

It should be noted that FIG. 13 shows an example in which the short-pulse laser is scanned on the single ceramic body 11. However, from the viewpoint of production efficiency, Step S04 is desirably performed in a state where the ceramic bodies 11 are arranged. Thus, the first inner grooves 16 and the second inner grooves 17 can be successively formed respectively in the first end surfaces E1 and the second end surfaces E2 of the ceramic bodies 11.

3.5 Step S05: Formation of External Electrodes

In Step S05, the first external electrode 14 and the second external electrode 15 are formed on the ceramic body 11 in which the first inner grooves 16 and the second inner grooves 17 are formed in Step S04, to thus produce the multi-layer ceramic capacitor 10 shown in FIGS. 1 to 3. Hereinafter, Examples 1 to 3 of forming the first and second external electrodes 14 and 15 will be described, but the method of forming the first and second external electrodes 14 and 15 is not limited to those examples.

Figure 14A:
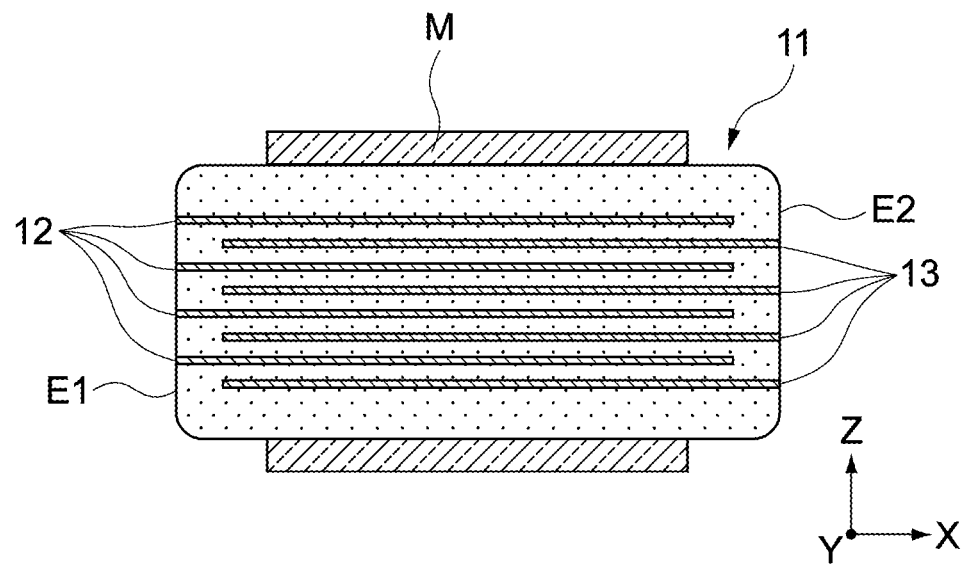
FIGS. 14A and 14B are cross-sectional views of the ceramic body in Step S05.
Figure 14B:
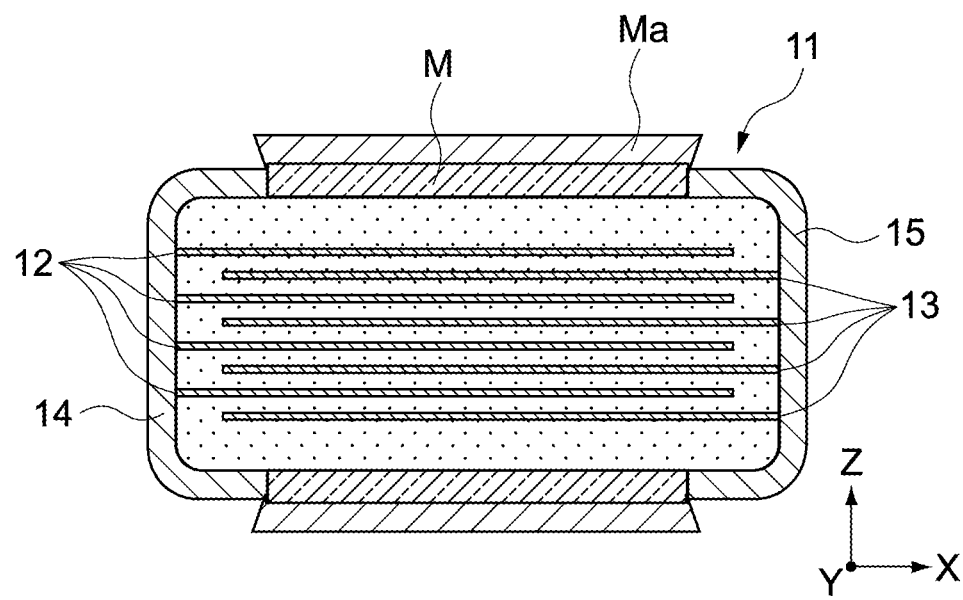

FIGS. 14A and 14B are cross-sectional views showing the process of Example 1 of forming the first and second external electrodes 14 and 15. As shown in FIG. 14A, first, a mask M is disposed in a region of the surface of the ceramic body 11, in which the first external electrode 14 and the second external electrode 15 are not to be formed. As shown in FIG. 14B, sputtering is performed on the ceramic body 11 on which the mask M is disposed.

Thus, the first external electrode 14 and the second external electrode 15 that are formed of sputtering films are respectively formed on the first end surface E1 and the second end surface E2 of the ceramic body 11. At that time, a metal film Ma is formed also on the mask M. The mask M is then removed from the ceramic body 11 together with the metal film Ma, so that the multi-layer ceramic capacitor 10 shown in FIGS. 1 to 3 is obtained.

In the Example 1 of forming the first and second external electrodes 14 and 15, the shapes of the first and second end surfaces E1 and E2 of the ceramic body 11 are likely to be reflected respectively in the shapes of the first and second external electrodes 14 and 15 by using sputtering. In other words, the outer grooves 18 and the outer grooves 19 (see FIG. 1) are likely to emerge respectively on the first external electrode 14 and the second external electrode 15 where the first inner grooves 16 and the second inner grooves 17 formed on the first end surface E1 and the second end surface E2 of the ceramic body 11 are reflected.

In the Example 1 of forming the first and second external electrodes 14 and 15, the first external electrode 14 and the second external electrode 15 are obtained by only a dry process without using a wet process such as electroplating. Therefore, since waste water or the like is not generated, an environmental load can be reduced. Additionally, in the multi-layer ceramic capacitor 10, faults resulting from hydrogen absorption, infiltration or adherence of a plating solution, and the like do not occur.

Further, in the Example 1 of forming the first and second external electrodes 14 and 15, the first external electrode 14 and the second external electrode 15 can be formed without performing heat treatment. Therefore, in the multi-layer ceramic capacitor 10 produced by using the Example 1 of forming the first and second external electrodes 14 and 15, a characteristic composition distribution can be obtained, in which thermal diffusion is not caused between the first internal electrodes 12 and the first external electrode 14 and between the second internal electrodes 13 and the second external electrode 15.

Figure 15A:
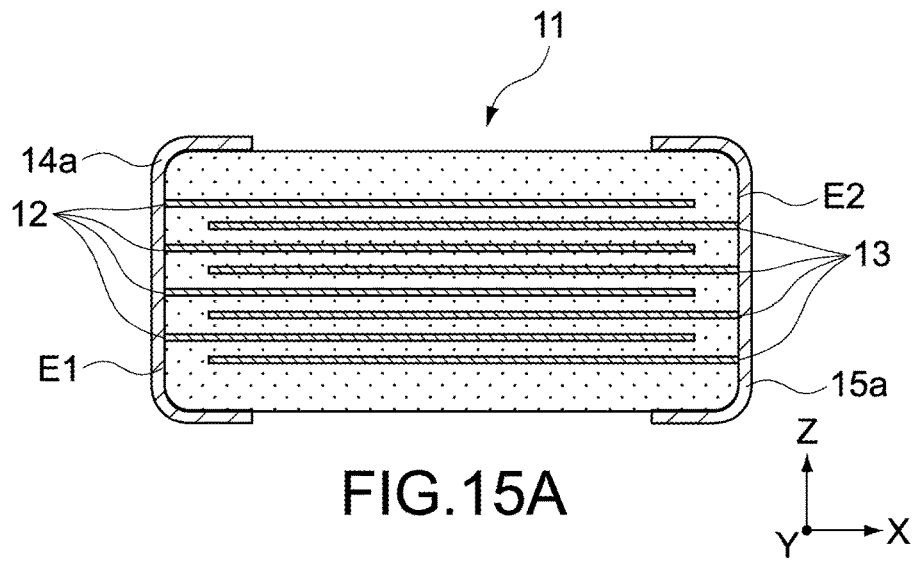
FIGS. 15A, 15B, and 15C are cross-sectional views of the ceramic body in Step S05.
Figure 15B:
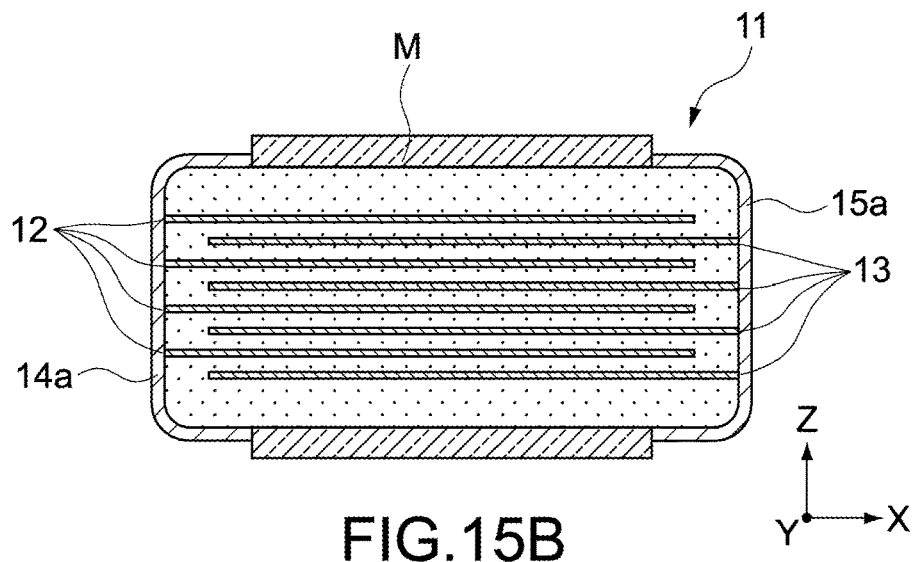
Figure 15C:
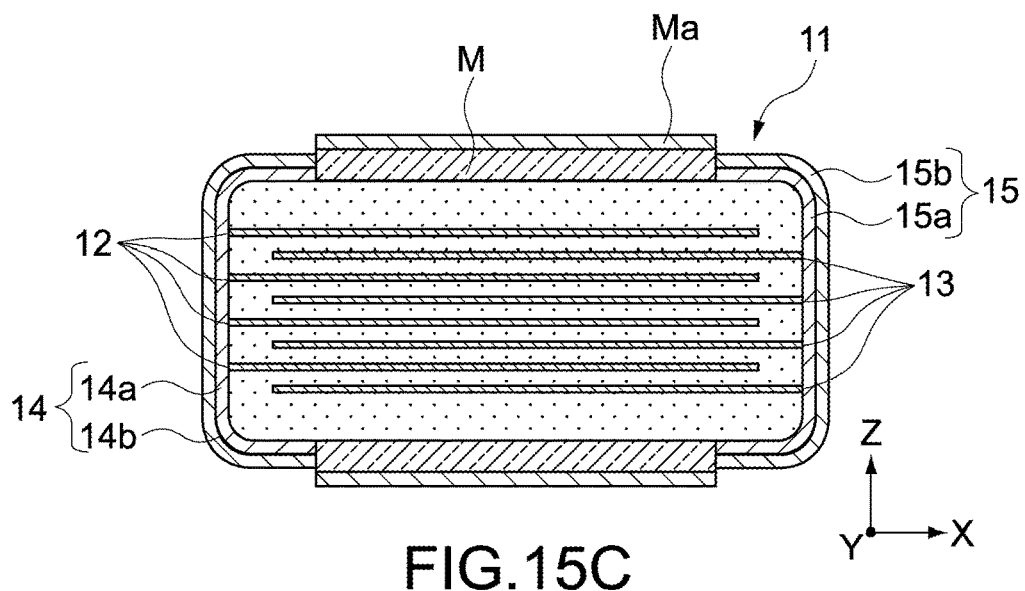

FIGS. 15A, 15B, and 15C are cross-sectional views showing the process of Example 2 of forming the first and second external electrodes 14 and 15. First, an electrically conductive paste is applied to a region of the surface of the ceramic body 11, in which the first external electrode 14 and the second external electrode 15 are to be formed. For the method of applying the electrically conductive paste, for example, a dip method or a printing method can be used.

The electrically conductive paste applied to the ceramic body 11 is then baked, to form an inner layer 14a of the first external electrode 14 and an inner layer 15a of the second external electrode 15, which are shown in FIG. 15A. The electrically conductive paste can be baked under a reduction atmosphere or a low-oxygen partial pressure atmosphere, for example.

Next, as shown in FIG. 15B, a mask M is disposed in a region of the surface of the ceramic body 11, in which the inner layers 14a and 15a are not formed. Subsequently, as shown in FIG. 15C, sputtering is performed on the ceramic body 11 on which the mask M is disposed, to form an outer layer 14b of the first external electrode 14 and an outer layer 15b of the second external electrode 15.

This provides the first external electrode 14 having a double-layer structure of the inner layer 14a and the outer layer 14b, and the second external electrode 15 having a double-layer structure of the inner layer 15a and the outer layer 15b. Subsequently, the mask M is removed from the ceramic body 11 together with a metal film Ma formed on the mask M. Thus, the multi-layer ceramic capacitor 10 shown in FIGS. 1 to 3 is obtained.

It should be noted that the outer layers 14b and 15b of the first and second external electrodes 14 and 15 may be formed by a method other than sputtering and can also be formed by, for example, a wet plating method or a vapor-deposition method. Further, the first external electrode 14 may have a three-layer structure including an intermediate film between the inner layer 14a and the outer layer 14b, and the second external electrode 15 may have a three-layer structure including an intermediate film between the inner layer 15a and the outer layer 15b. Additionally, the first external electrode 14 and the second external electrode 15 may each have a structure including four layers or more.

Figure 16A:
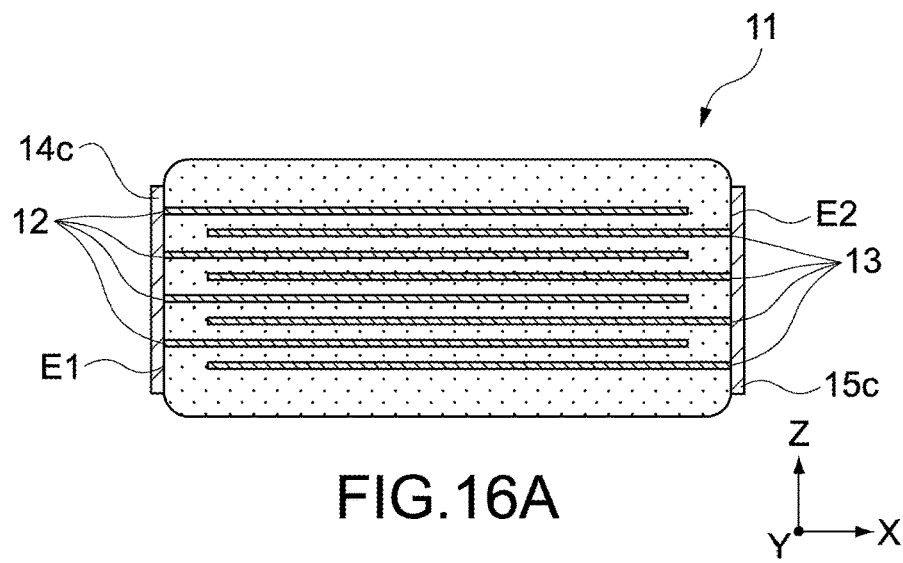
FIGS. 16A, 16B, and 16C are cross-sectional views of the ceramic body in Step S05.
Figure 16B:
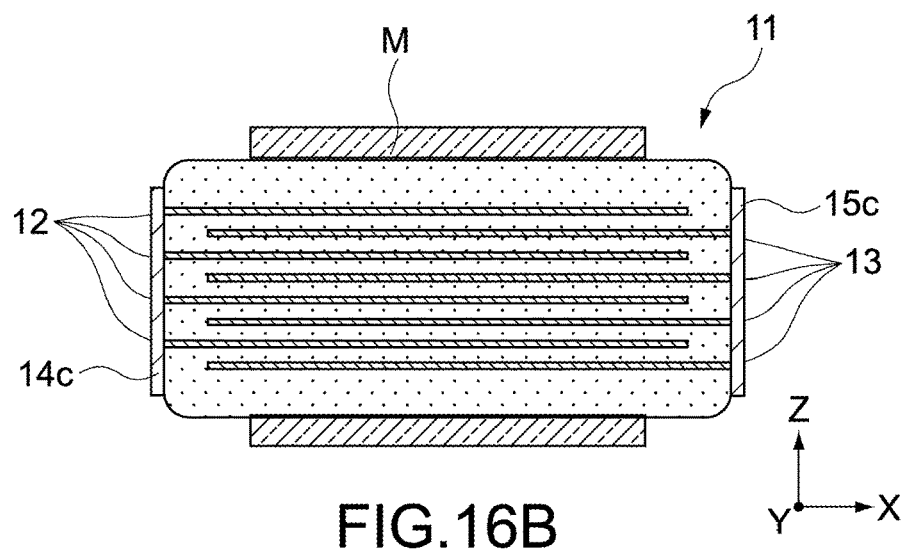
Figure 16C:
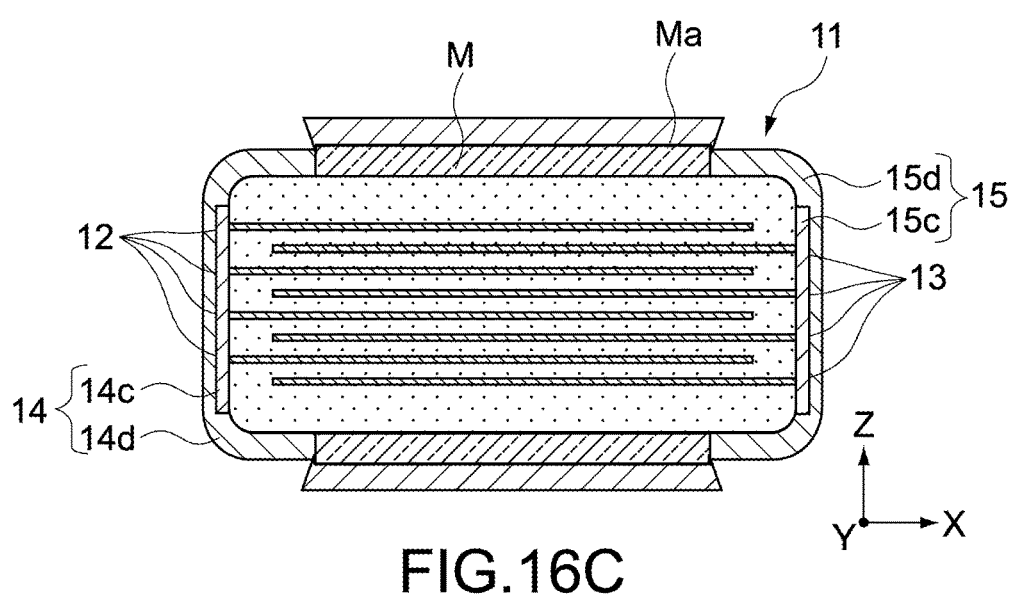

FIGS. 16A, 16B, and 16C are cross-sectional views showing the process of Example 3 of forming the first and second external electrodes 14 and 15. First, an electrically conductive paste is applied to regions of the first end surface E1 and the second end surface E2 of the ceramic body 11, the first internal electrodes 12 and the second internal electrodes 13 being drawn to those regions. The electrically conductive paste applied to the ceramic body 11 is then baked, to form connection layers 14c and 15c shown in FIG. 16A.

Next, as shown in FIG. 16B, a mask M is disposed in a region of the surface of the ceramic body 11, in which the first external electrode 14 and the second external electrode 15 are not to be formed, the connection layers 14c and 15c being formed on the ceramic body 11. Subsequently, sputtering is performed on the ceramic body 11 on which the mask M is disposed, to form covering layers 14d and 15d shown in FIG. 16C.

This provides the first external electrode 14 including the connection layer 14c and the covering layer 14d, and the second external electrode 15 including the connection layer 15c and the covering layer 15d. Subsequently, the mask M is removed from the ceramic body 11 together with a metal film Ma formed on the mask M. Thus, the multi-layer ceramic capacitor 10 shown in FIGS. 1 to 3 is obtained.

In the Example 3 of forming the first and second external electrodes 14 and 15, the electrically conductive paste is baked to form the connection layers 14c and 15c before the covering layers 14d and 15d are formed. This improves connectivity of the first external electrode 14 to the first internal electrodes 12 and of the second external electrode 15 to the second internal electrodes 13. With this configuration, electrical conduction between the first internal electrodes 12 and the first external electrode 14 and between the second internal electrodes 13 and the second external electrode 15 can be obtained more reliably.

Meanwhile, the regions where the connection layers 14c and 15c are to be formed are limited to regions in the first and second end surfaces E1 and E2 of the ceramic body 11, the first internal electrodes 12 and the second internal electrodes 13 being drawn to those regions. Thus, the thickness of the multi-layer ceramic capacitor 10 in the Z-axis direction can be suppressed. This configuration is advantageous in the increase in capacitance and the low profile of the multi-layer ceramic capacitor 10.

4. Other Embodiments

While the embodiment of the present invention has been described, the present invention is not limited to the embodiment described above, and it should be appreciated that the present invention may be variously modified.

For example, in the multi-layer ceramic capacitor 10, the number of first inner grooves 16 and second inner grooves 17 in the first and second end surfaces E1 and E2 of the ceramic body 11 can be optionally determined. However, from the viewpoint of reliability of electrical conduction between the first internal electrodes 12 and the first external electrode 14 and between the second internal electrodes 13 and the second external electrode 15, the first end surface E1 and the second end surface E2 of the ceramic body 11 desirably include the plurality of first inner grooves 16 and the plurality of second inner grooves 17, respectively.

Further, in the ceramic body 11, the configuration of the first inner grooves 16 in the first end surface 1 and the configuration of the second inner grooves 17 in the second end surface E2 may be different from each other. For example, in the ceramic body 11, the number of first inner grooves 16 and that of second inner grooves 17, the arrangement of the first inner grooves 16 and that of the second inner grooves 17, the shapes of the first inner grooves 16 and those of the second inner grooves 17, and the like may be different from each other.

What is claimed is:

1. A multi-layer ceramic capacitor, comprising:
   a ceramic body including
      ceramic layers laminated along a first direction,
      first internal electrodes and second internal electrodes that are alternately disposed between the ceramic layers,
      a first end surface and a second end surface that are oriented in a second direction orthogonal to the first direction, and
      at least one first inner groove and at least one second inner groove that are respectively formed in the first end surface and the second end surface along the first direction; and
   a first external electrode and a second external electrode that respectively cover the first end surface and the second end surface,
   the first internal electrodes being drawn to the first end surface and protruding in the at least one first inner groove, the second internal electrodes being drawn to the second end surface and protruding in the at least one second inner groove.

2. The multi-layer ceramic capacitor according to claim 1, wherein
   the at least one first inner groove includes a plurality of first inner grooves, and
   the at least one second inner groove includes a plurality of second inner grooves.

3. The multi-layer ceramic capacitor according to claim 1, wherein
   the first external electrode includes at least one first outer groove, the at least one first outer groove corresponding to the at least one first inner groove and being formed along the first direction, and
   the second external electrode includes at least one second outer groove, the at least one second outer groove corresponding to the at least one second inner groove and being formed along the first direction.

4. A method of producing a multi-layer ceramic capacitor, comprising:
   producing an unsintered ceramic body including
      ceramic layers laminated along a first direction,
      first internal electrodes and second internal electrodes that are alternately disposed between the ceramic layers, and
      a first end surface and a second end surface that are oriented in a second direction orthogonal to the first direction, the first internal electrodes being drawn to the first end surface, the second internal electrodes being drawn to the second end surface;
   sintering the ceramic body;
   forming a first inner groove in the first end surface of the sintered ceramic body and a second inner groove in the second end surface of the sintered ceramic body along the first direction by irradiation with short-pulse laser, to cause the first internal electrodes and the second internal electrodes to respectively protrude in the first inner groove and the second inner groove; and forming a first external electrode on the first end surface and a second external electrode on the second end surface, the first end surface including the first inner groove, the second end surface including the second inner groove.

5. The method of producing a multi-layer ceramic capacitor according to claim 4, wherein the short-pulse laser includes one of pico-second laser and femto-second laser.

6. The method of producing a multi-layer ceramic capacitor according to claim 4, wherein the first external electrode and the second external electrode are formed by sputtering.

7. The method of producing a multi-layer ceramic capacitor according to claim 4, wherein the first inner groove and the second inner groove are formed after the sintered ceramic body is reoxidized.

\* \* \* \* \*